US006431610B1

(12) United States Patent
Ohirano et al.

(10) Patent No.: US 6,431,610 B1
(45) Date of Patent: Aug. 13, 2002

(54) TUBE ASSEMBLY FOR COMMUNICATING WATER TO A FIXTURE

(75) Inventors: Tetsuya Ohirano, Dunwoody, GA (US); Noboru Ogawa, Beijing (CN); Yusuke Kato, Fujisawa (JP)

(73) Assignees: Beijing Bork Metal Hose, Co., Ltd., Beijing (CN); Iwatani International Corporation, Tokyo (JP); Iwatani International Corporation, Gardena, CA (US)

( * ) Notice: Subject to any disclaimer, the term of this patent is extended or adjusted under 35 U.S.C. 154(b) by 0 days.

(21) Appl. No.: 09/418,143

(22) Filed: Oct. 14, 1999

(51) Int. Cl.[7] .............................. F16L 21/00; F16L 25/00
(52) U.S. Cl. ...................... 285/32; 285/305; 285/903; 137/15.09; 137/355; 4/676
(58) Field of Search .................... 285/32, 305, 903; 137/15.09, 359; 4/476

(56) References Cited

U.S. PATENT DOCUMENTS

| 1,054,132 | A | | 2/1913 | Miner | |
|---|---|---|---|---|---|
| 1,935,714 | A | | 11/1933 | Hummell | 153/79 |
| 2,112,238 | A | | 3/1938 | Guarnaschelli | 285/222.1 |
| 2,363,586 | A | | 11/1944 | Guarnaschelli | 285/222.1 |
| 2,848,254 | A | | 8/1958 | Millar | 285/222.1 |
| 2,858,147 | A | | 10/1958 | Guarnaschelli | 285/222.1 |
| 3,380,764 | A | | 4/1968 | Wilson | 285/903 |
| 3,743,328 | A | | 7/1973 | Longfellow | 285/903 |
| 3,813,756 | A | | 6/1974 | Rigsby et al. | 29/427 |
| 3,821,890 | A | | 7/1974 | Dewey | 72/325 |
| 3,910,093 | A | | 10/1975 | Maloney, Jr. et al. | 72/325 |
| 3,934,902 | A | | 1/1976 | McNamee | 285/903 |
| 4,502,165 | A | * | 3/1985 | Szemeredi et al. | 4/192 |
| 4,630,850 | A | | 12/1986 | Saka | 285/903 |
| 4,729,583 | A | | 3/1988 | Lalikos et al. | 285/903 |
| 4,907,830 | A | | 3/1990 | Sasa et al. | 285/903 |
| 5,024,419 | A | * | 6/1991 | Mulvey | 251/148 |
| 5,080,405 | A | | 1/1992 | Sasa et al. | 285/903 |
| 5,165,727 | A | * | 11/1992 | Valley | 285/12 |
| 5,375,887 | A | * | 12/1994 | Johnson | 285/12 |
| 5,419,363 | A | * | 5/1995 | Robinson | 137/360 |
| 5,480,122 | A | * | 1/1996 | Barker | 251/148 |
| 5,516,155 | A | * | 5/1996 | Ko | 285/12 |
| 5,639,063 | A | * | 6/1997 | Barker | 251/148 |
| 5,799,989 | A | * | 9/1998 | Albino | 285/334.5 |
| 6,019,399 | A | * | 2/2000 | Sweeney | 285/248 |
| 6,102,445 | A | * | 8/2000 | Thomas | 285/139.1 |

FOREIGN PATENT DOCUMENTS

| FR | 765729 | 6/1934 |
|---|---|---|
| GB | 416740 | 9/1934 |
| GB | 515745 | 12/1939 |
| GB | 530368 | 12/1940 |

OTHER PUBLICATIONS

The Home Depot ProBook Catalog, Professional Equipment & Supply Catalog; 1999 Edition; pp. 851,852,983,984,1012.

* cited by examiner

*Primary Examiner*—Teri Pham Luu
*Assistant Examiner*—Carlos Lugo
(74) *Attorney, Agent, or Firm*—Baker, Donelson, Bearman & Caldwell

(57) ABSTRACT

A tube assembly for communicating water under pressure from a water supply valve and a water fixture inlet tube assembled at a job site, having an elongate corrugated tube with alternating grooves and ridges and cut to length to extend between a water fixture inlet tube and a water supply valve. The tube receives a pair of nuts in opposing relation, and each nut has an interior thread sized for engaging a respective one of a water fixture inlet tube and a water supply valve. A pair of C-clips, each received in a respective one of the grooves in opposing distal end portions of the tube, define bearing surfaces for the nuts. The distal ends of the tube receive a gasket, which are adapted for sealing between the respective distal end of the tube and the water fixture inlet tube and the water supply valve.

15 Claims, 4 Drawing Sheets

TUBE ASSEMBLY FOR COMMUNICATING WATER TO A FIXTURE

TECHNICAL FIELD

The present invention relates to water fixtures. More particularly, the present invention relates to tubular assemblies for communicating water from supply valves to water fixtures.

BACKGROUND OF THE INVENTION

There are a number of water fixtures used in plumbing for homes and offices. These fixtures include toilets, faucets, ice makers, washing machines (although washing machines are not typically considered as fixtures), water heaters and other such fixtures. Generally, these fixtures include a water inlet, a control valve, and a water outlet. The control valve is actuated to control the flow of water from the inlet of the fixture to the outlet of the fixture. Water is communicated to the fixture by a supply line. Plumbing materials are used to connect the water supply line to the inlet of the fixture.

Often the water supply tube and the inlet to the fixture are of different sizes. Typical fittings for water supply are compression fittings of ¼ inch, ⅜ inch, and ½ inch. Other types and sizes of fittings are iron pipe of ½ and ¾ inches, and ⅞ inch ballcock fitting. On the other hand, the inlet tubes for fixtures generally are ¼, ⅜, or ½ inch compression fittings, ½ inch iron pipe, ⅞ inch ballcock, and ¾ inch hose round.

There are various techniques employed to plumb the connection between the water supply and the fixture. Traditionally, rigid connections using copper pipe and fittings have been assembled by plumbers on site. This involves cutting copper tubing to size, and soldering the tubes and connectors for joining the supply to the fixture. However, there is a significant "do-it-yourself" market which has sought simpler connectors to join the water supply to the water inlet of the fixture. In response to this need, manufacturers have provided preassembled connectors comprising elongate tubes having threaded fasteners at opposing distal ends. Typically, the tubes are plastic and jacketed with a metal woven skin. These preassembled connectors provided in a number of configurations to met the various combinations of differently sized supply line fittings and fixture fittings. Also, these preassembled connectors are provided in a range of lengths. During installation, the excess length is accommodated by forming loops or bending the tube, whereby the fasteners are threadably engaged to appropriate connecters on the supply and inlet of the fixture.

While such devices have provided connectors between water supplies and fixtures, there are drawbacks to the use of such. The looping of the excess length is unattractive and, if bent, may form a weakened portion in the connector which is susceptible to high pressure failure. In some circumstances, connectors having a length that are just sufficient are used. This stresses the resilient tubing and leads to weakened connection which is also susceptible to failure. Further, plumbers and other persons plumbing these connections need to carry a large supply of a variety of fittings, due to the significant number of different combinations of fittings and lengths.

Accordingly there is a need in the art for providing improved plumbing connections which are readily assembled on site for connecting water supply tubes to water inlet tubes for water fixtures, which have differing tube diameters. It is to such that the present invention is directed.

BRIEF SUMMARY OF THE INVENTION

The present invention meets the need in the art by providing a tube assembly readily assembled on site for communicating water under pressure from a water supply valve and a water fixture inlet tube, comprising an elongate tube that defines a plurality of annular corrugations having alternating grooves and ridges. The elongate tube is cut to length to extend between a water fixture inlet tube and a water supply valve. The elongate tube receives a pair of nuts in opposing relation. Each nut has an interior thread sized for threadingly engaging a respective one of a water fixture inlet tube and a water supply valve. opposing distal end portions of the elongate tube receive one of a pair of C-clips in one of the grooves in the opposing distal end portions of the tube, which C-clips define bearing surfaces for the nuts. The opposing distal ends of the elongate tube receive one of a pair of gaskets which are adapted for sealing between the respective distal ends of the tube and the water fixture inlet tube and the water supply valve, with the respective nuts bearing against the C-clips.

In another aspect, the present invention provides a method of connecting a water supply valve and a water fixture inlet tube with a tube assembly for communicating water under pressure, comprising the steps of:

(a) slidingly receiving a pair of nuts in opposing relation on an elongate tube that defines a plurality of annular corrugations having alternating recesses and ridges;

(b) engaging one of a pair of C-clips onto a respective selected one of the recesses in opposing distal end portions of the elongate tube;

(c) placing one of a pair of gaskets on the opposing distal end portions of the elongate tube and each bottoming against one of the C-clips;

(d) connecting the respective distal ends of the elongate tube to the fixture inlet tube and the water supply tube, whereby the gaskets seal the connections between the respective distal ends of the elongate tube and the fixture inlet tube and the water supply tube while the nuts bear against respective second surfaces of the C-clips.

In another aspect, the present invention provides a method of connecting a water supply valve and a water fixture inlet tube with a tube assembly for communicating water under pressure, comprising the steps of:

(a) slidingly receiving a first nut on an elongate tube defining a plurality of annular corrugations having alternating recesses and ridges;

(b) engaging a first C-clip onto a selected one of the recesses in a first distal end portion of the elongate tube;

(c) placing a first gasket on the first distal end portion of the elongate tube and bottoming against a first surface of the first C-clip;

(d) inserting the gasket into an open end of the water fixture inlet tube and cutting the elongate tube to length relative to a water supply valve;

(e) slidingly receiving a second nut on the elongate tube;

(f) engaging a second C-clip onto a selected one of the recesses in a second distal end portion of the elongate tube;

(g) placing a second gasket on the second distal end portion of the elongate tube and bottoming against a first surface of the second C-clip;

(h) connect the respective distal ends of the elongate tube to the fixture inlet tube and the water supply tube, whereby the gaskets seal the connections between the respective distal ends of the elongate tube and the fixture inlet tube and the water supply tube while the nuts bear against respective second surfaces of the C-clips.

Objects, advantages and features of the present invention will become apparent from a reading of the following detailed description of the invention and claims in view of the appended drawings.

DETAILED DESCRIPTION OF THE PREFERRED EMBODIMENTS

Figure 1:
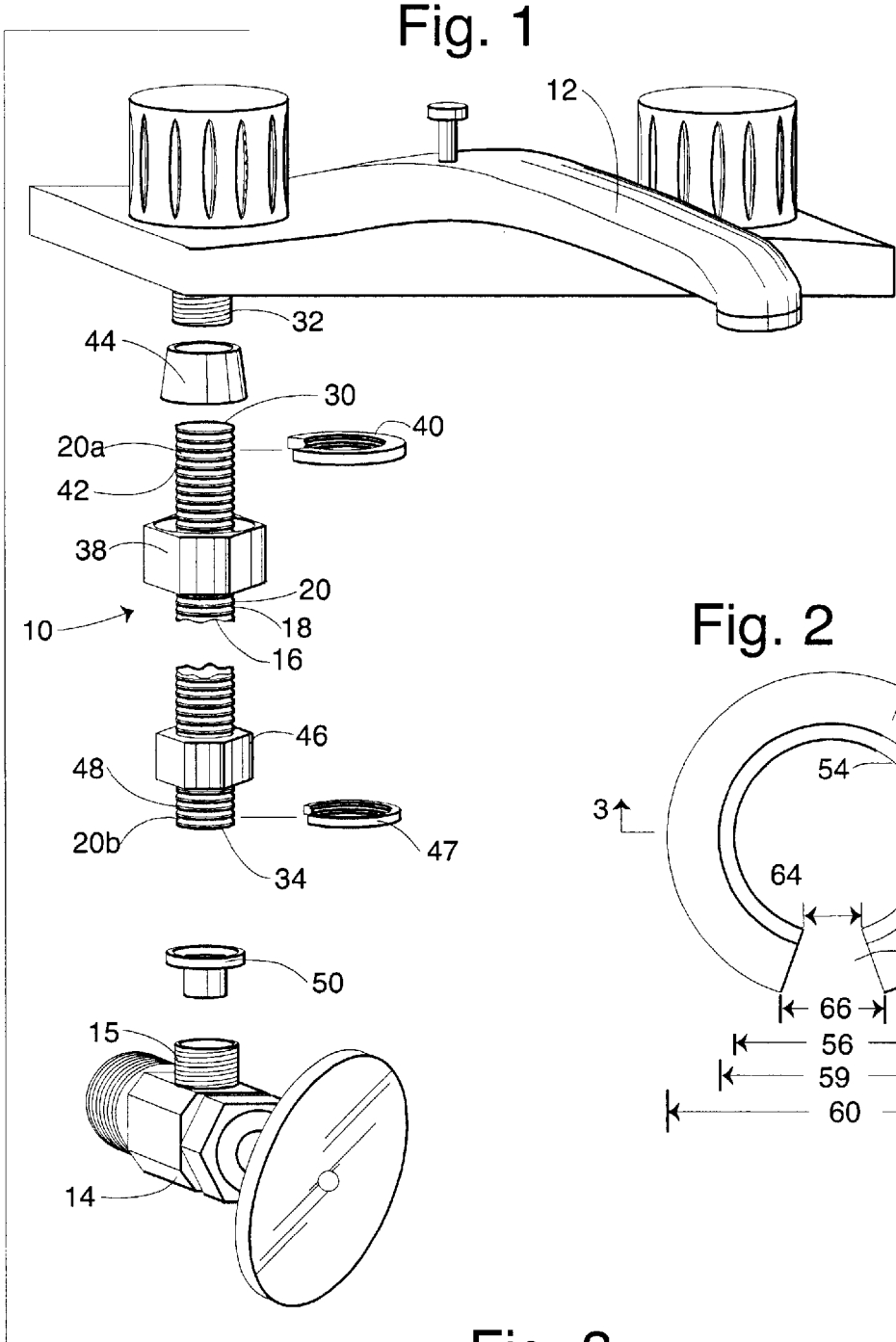
FIG. 1 is an exploded perspective view of an embodiment of a tube assembly for supplying water to a fixture according to the present invention.

Referring now in more detail to the drawings in which like parts have like identifiers, FIG. 1 illustrates in perspective view an embodiment of a tube assembly 10 for connecting a fixture 12 to a supply shut-off valve 14 having a threaded opening 15 for supply of water to the fixture in accordance with the present invention for a water communication device readily assembled at the job site, as discussed below. The tube assembly 10 includes an elongate corrugated tube 16 that is cut to length at the job site preferably from a coil of tubing. The tube 16 is preferably a ⅜ inch nominal size corrugated tubing that defines ridges 18 and grooves 20 or recesses between the ridges. In a preferred embodiment, the tube 16 is type AISI 316L stainless steel fully bright annealed for corrosion resistance and having independent annular rings defining the ridges 18 and grooves 20 for flexibility in forming a kink-free connector. The tube 16 preferably has a wall thickness that ranges from about 0.24 mm to about 0.28 mm, with a preferred wall thickness of 0.26 mm. The cross-sectional diameter of the tube 16 at the grooves 20 is in a range from about 7.9 mm to about 8.3 mm, and preferably is 8.1 mm. The cross-sectional diameter of the tube 16 at the ridges 18 is in a range from about 11.5 mm to 11.9 mm, and preferably is 11.7 mm. The spacing between adjacent peaks of the ridges 18 is in a range from about 4.0 mm to about 4.4 mm, and preferably is 4.2 mm.

The tube assembly 10 defines a first distal end 30 which connects to an inlet tube 32 of the fixture 12 and a second distal end 34 which connects to the threaded opening 15 of the water supply valve 14. Typically, fixtures use one-half inch iron pipe fittings (conventionally known as "IP fittings") to connect to water supply tubes. In the illustrated embodiment, a conventional nut 38 having an interior thread for a one-half inch IP fitting is received on the tube 16. A first C-clip 40 engages a selected one of the grooves 20 in a portion 42 of the tube 16 near the first distal end 30. The C-clip 40 is a ring that has a slotted opening whereby the C-clip in plan view defines a C shape. The distal portion 42 of the tube 16 slidingly receives a gasket 44.

Typically, water supply valves 14 use either three-eighths inch or one-half inch compression fittings to connect to water supply tubes. The embodiment of the tube apparatus 10 shown in FIG. 1 is gainfully used with three-eighths inch compression fitting. A nut 46 having an interior thread for a three-eighths inch compression fitting is received on the tube 16. A second C-clip 47 engages a selected one of the grooves 20 in a portion 48 of the tube 16 near the second distal end 34. The distal portion 48 engages a gasket 50 that seals the connection between the tube 16 and the water supply valve 14.

Figure 2:
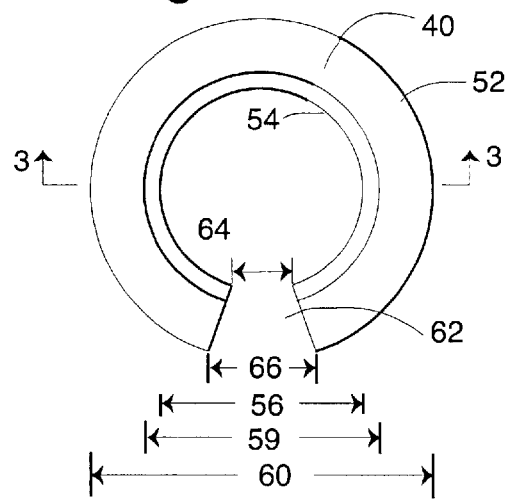
FIG. 2 is an enlarged top plan view of a C-clip used with the tube assembly shown in FIG. 1.
Figure 3:
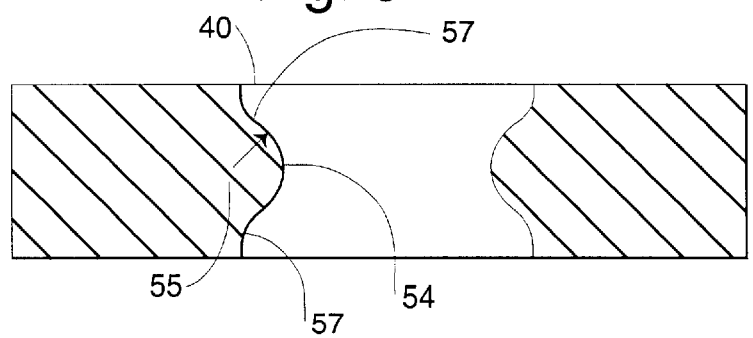
FIG. 3 is a cross-sectional view of the C-clip shown in FIG. 2, taken along line 3—3.
Figure 4:
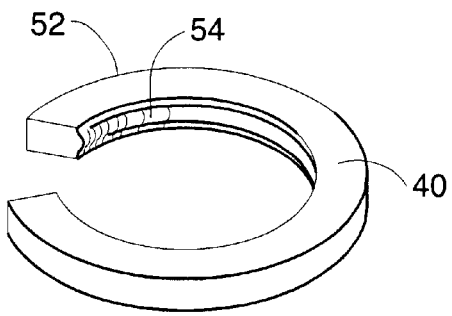
FIG. 4 is an enlarged perspective view of the C-clip illustrated in FIG. 2.

FIGS. 2–4 illustrate the first C-clip 40 used with the tube assembly 10. FIG. 2 is an enlarged top plan view and FIG. 3 is a cross-sectional view taken along line 3—3. FIG. 4 is perspective view of the first C-clip 40. The first C-clip 40 provides a squared-off exterior face 52 and defines an inwardly extending radiused flange 54 having a cross-section configured for being received by one of the grooves 20 of the corrugated tube 16, as best illustrated in FIG. 3. In a preferred embodiment, the radius 55 is 0.7 mm with opposing arcuate surfaces 57 defined by a radii of 0.85 mm. In a preferred embodiment, the first C-clip 40 has an inner flange diameter 56 of 9.5 mm with an inner ring diameter 59 of 12 mm. For a seven-eighths ballcock fitting, the C-clip has an exterior diameter 60 of 21.6 mm and for a one-half inch IP fitting the exterior diameter 60 is 18.5 mm. The C-clip 40 has a thickness of 2.0 mm. Due to the size of the C-clip and to facilitate opening for sliding into one of the grooves 20, the C-clip 40 defines a tapered gap 62. For one-half inch IP, a narrow portion 64 is 5.5 mm and a wide portion 66 is 9.0 mm; for seven-eighths ballcock fittings, the narrow portion 64 is 7.0 mm and the wide portion 66 is 11.0 mm.

Figure 5:
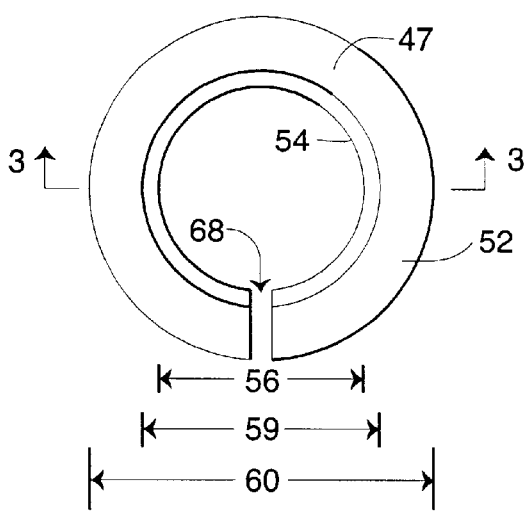
FIG. 5 is an enlarged top plan view of a second C-clip used with the tube assembly shown in FIG. 1.
Figure 10:
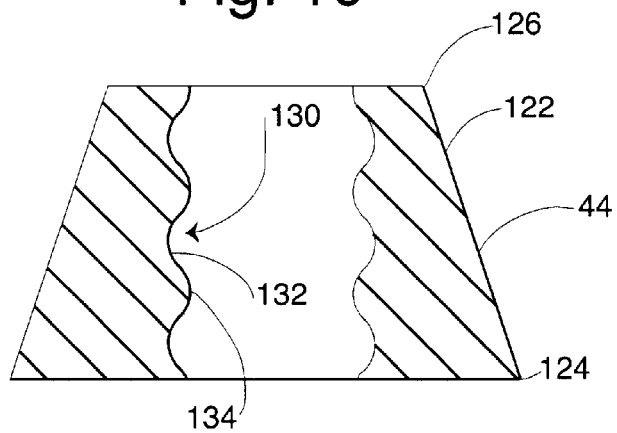
FIG. 10 is a side cross-sectional view of a gasket for use with the tube assembly shown in FIG. 1.

FIG. 5 is an enlarged top plan view of the second C-clip 47 used with the tube assembly 10 shown in FIG. 10 for three-eighths inch compression fittings. As with the first C-clip 40, the second C-clip 47 provides the squared-off exterior face 52 and defines the inwardly extending arcuately radiused flange 54 having a cross-section configured for being received by one of the grooves 20 of the corrugated tube 16. As with the C-clip 40 shown in FIG. 3, the radius 55 of the flange 54 is 0.7 mm with opposing arcuate surfaces 57 defined by a radius of 0.85 mm. The inner flange diameter 56 is 9.5 mm with an inner ring diameter 59 of 12 mm. The second C-clip 47 for a three-eighths inch compression fitting has an exterior diameter 60 of 12.8 mm and for a one-half inch compression fitting the exterior diameter 60 is 15.8 mm. The C-clip 47 defines a narrow 0.5 mm gap 68 for slidingly pushing the C-clip into the selected groove 20.

Figure 6:
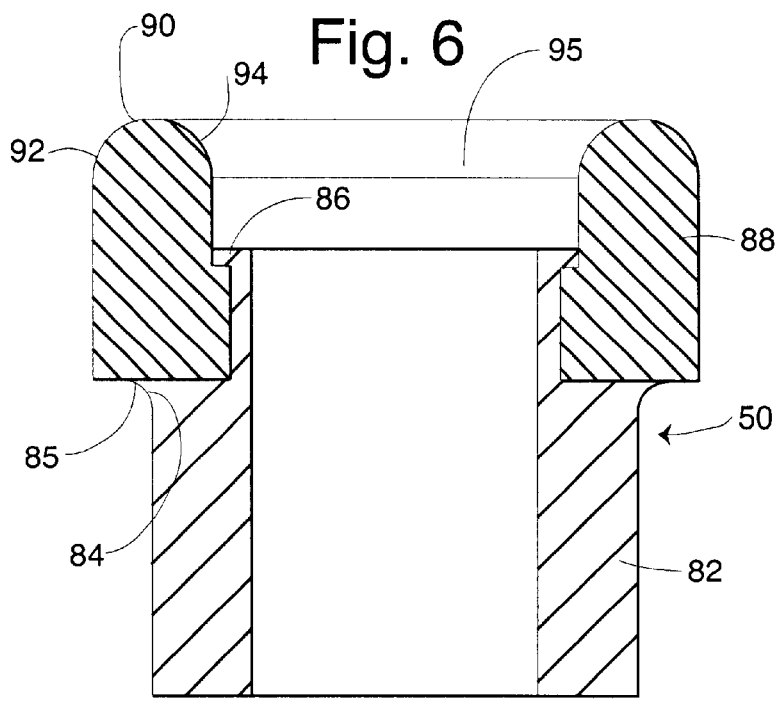
FIG. 6 is a side cross-sectional view of a gasket used with the tube assembly shown in FIG. 1.

FIG. 6 is a side cross-sectional view of the gasket 50 or packing used with the tube assembly 10 for ⅜ inch compression fitting. The gasket 50 comprises a two-part member having a tailpiece 82 received within a threaded opening of the water supply valve. The tailpiece 82 preferably is formed of metal such as bronze, but may be a hard plastic or other suitable material. The tailpiece 82 defines a first flange 84 extending radially and that defines a tapered surface 85. An opposing flange 86 is spaced-apart from the tapered flange 84, and together, the flanges 84, 86 cooperatively define a recess for receiving a resilient member 88. The member 88 defines an opening 95 to the tailpiece 82 and flange 86. A distal edge 90 of the member 88 defines a pair of opposing round beveled surfaces 92, 94. The beveled surface 94 matingly engages an arcuate portion of a ridge 18 when the tube 16 is joined to the fixture and water supply as discussed below.

Figure 7:
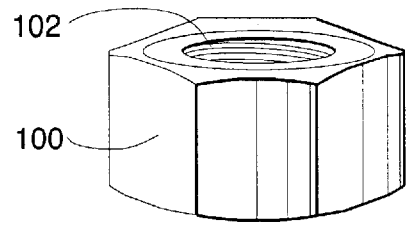
FIG. 7 a perspective view of a prior art nut.
Figure 8:
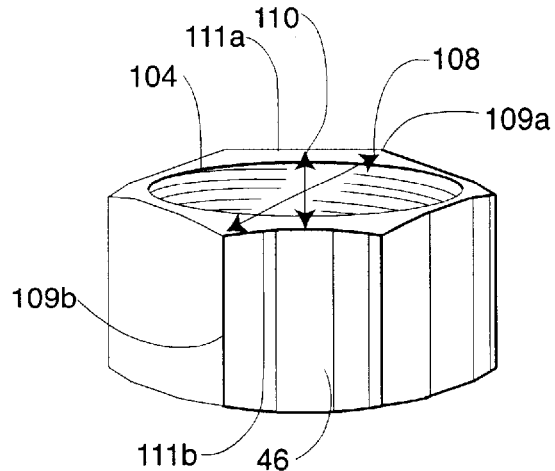
FIG. 8 is a perspective view of a nut used with the tube assembly shown in FIG. 1.
Figure 8A:
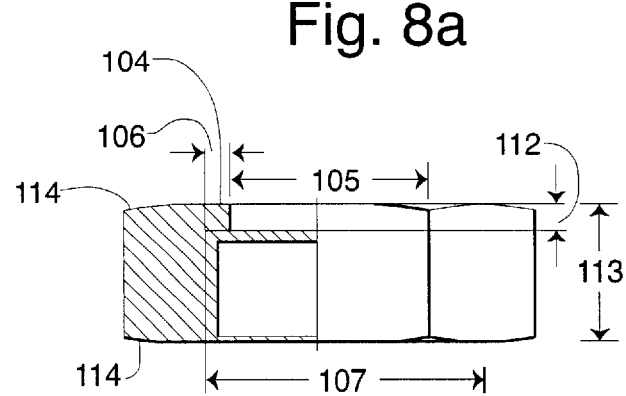
FIG. 8a is a side partial cross-sectional view of the nut illustrated in FIG. 8.

FIG. 7 is a perspective view of a prior art nut 100 suitable for a nominal three-eighths inch diameter tubing. The nut 100 has a threaded interior surface and an opening 102 sized for being received over the tube. The opening 102 defines a partially closed end with a relatively broad shoulder. However, because of the oversize diameter of the tubing 16 preferred for use with the present invention, the non-conventional nut 46 is used, as best illustrated in FIG. 8. The nut 46 has an inner thread suitable for engaging the three-eighths compression fitting on supply valves 14. However, the partially closed end defines an enlarged opening 103 sized for receiving the tube 16 therethrough. This results in a narrowed shoulder 104. With reference to FIGS. 8 and 8a, the nut 46 defines the opening 103 having a length 105 of approximately 12.0 mm while the width 106 of the shoulder 104 measured between an edge of the opening 103 and the radially outward surface of the thread is 0.85 mm. This provides an overall opening width 107 of 13.7 mm. The nut 46 has a length 108 of approximately 18.0 mm measured across opposing apexes 109a, 109b and a length 110 of approximately 16.0 mm measured across opposing flats 111a, 111b of the nut 46. The thickness 112 of the shoulder 104 is approximately 3.0 mm, and the nut 46 has an overall width 113 of 15.2 mm. The nut 46 preferably has conventional beveled faces 114 between the shoulder 104 and the outward edges.

Figure 9:
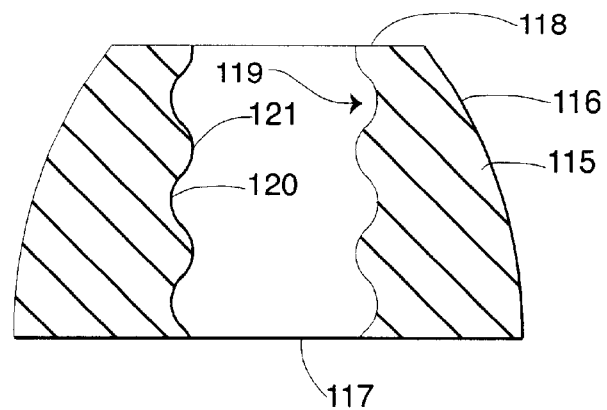
FIG. 9 is a side cross-sectional view of a gasket for use with the tube assembly shown in FIG. 1.

FIG. 9 is a side cross-sectional view of a gasket 115 for use with the tube assembly 10. The gasket 115 is suitable for use with seven-eighths ballcock fittings rather than the gasket 44. The gasket 115 has a arcuately tapered exterior surface 116. The surface 116 extends arcuately from a first base 117 to a second base 118. The gasket 115 defines an interior face 119 having grooves 120 and ridges 121 that conform respectively to the ridges 18 and grooves 20 of the corrugated tube 16.

FIG. 10 is a side cross-sectional view of a gasket 44 for use with the tube assembly 10. The gasket 44 is suitable for use with one-half inch IP or compression fittings. The gasket 44 has a linear tapered exterior surface 122 extending from a wide base 124 to a narrow base 126. The wide base 124 bears against one of the C-clips 40, 47 and the narrow base 126 is received by the fixture inlet tube or the water supply valve 14. The gasket 44 defines an interior face 130 having grooves 132 and ridges 134 that conform respectively to the ridges 18 and grooves 20 of the corrugated tube 16.

Figure 11:
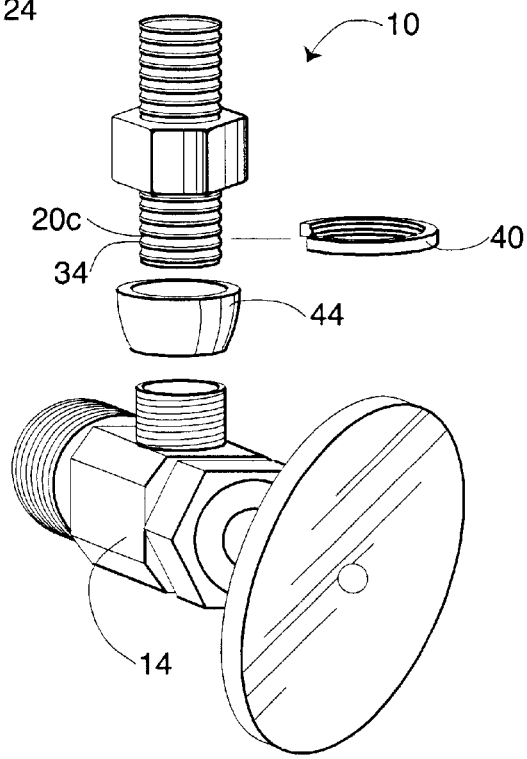
FIG. 11 s a perspective view of the tube assembly shown in FIG. 1 connected to a supply fixture using the gasket shown in FIG. 10.

FIG. 11 is an exploded perspective view of the tube assembly 10 shown in FIG. 1 with a distal end for connecting to a supply fixture using the gasket 44 shown in FIG. 10.

The tube assembly 10 of the present invention is preferably assembled at a job site where the water fixture 12 is to be connected to a supply of water under pressure through the water supply valve 14. The water fixture 12 in the embodiment illustrated in FIG. 1 has a one-half inch IP threaded connection. The first nut 38 is slidingly received on a free-distal end 30 of the corrugated tube 16. A first C-clip 40 is received into the third one 20a of the grooves 20 from the end 30 of the elongate tube 16. The gasket 44 is placed on a portion of the distal end 30 of the elongate tube 16. The gasket 44 seats against a surface of the first C-clip 40.

The proper length of the tube 16 is then determined. This is accomplished by inserting the distal end 30 of the tube 16 with the gasket 44 into an open end of the water fixture inlet tube 32. The coil of tubing is unrolled to position a portion of the tubing remote from the first end 30 adjacent the open end 15 of the water supply valve 14. For angular deflections, the tubing is shaped into an "S" or other form before measuring the length of the tubing for cutting. The groove aligned with the open end 15 of the water supply valve 14 is marked for cutting. Preferably, the coil of tubing is cut with a tube cutter at the center of the appropriate groove. If necessary, after cutting, the tubing is gently bent back and forth to separate the tube 16 from the coil. The edge preferably is clean and burr-free. At least one inch portions of the opposing distal ends 30, 34 are maintained substantially straight and linear to the connections between the tube 16 and the water fixture inlet tube and the water supply valve 14.

The distal end 34 then slidingly receives the nut 46 on the elongate tube 16. For the embodiment illustrated in FIG. 1, the water supply valve 15 is a three-eighths inch compression fitting. The second C-clip 47 engages a selected one of the grooves 20 in a portion of the second distal end 34 of the elongate tube 16. In the embodiment illustrated in FIG. 1 for a three-eighths inch compression fitting on the water supply valve 14, the C-clip 40 engages the first groove 20b from the end 30. The gasket 50 is placed in the opening 15 of the water supply valve 14. Then the second distal end 34 of the elongate tube 16 is received in the opening 95. The edge 90 of the gasket 50 seats against the C-clip 47. The end of the tube 16 seats on the flange 86. The arcuate surface 94 matingly engages arcuate ridges 18 in the tube 16. The arcuate flange 84 of the gasket 80 seats in the open end of the ⅜ compression fitting opening 15 of the water supply valve 14.

The respective distal ends of the elongate tube 16 connect to the fixture inlet tube and the water supply tube by sliding the nuts 38, 46 over the respective gaskets 44, 50 and threadingly engaging the fixture inlet tube and the water supply valve 14. The C-clips 40, 47 maintain the nuts 38, 46 square relative to the fitting to which the nuts connect, so that the tube 16 is not at an oblique angle relative to a longitudinal axis of the nut. The gaskets 44, 50 seal the connections between the respective distal ends of the elongate tube 16 and the fixture inlet tube and the water supply tube while the nuts 38, 46 bear against respective second surfaces of the C-clips 40, 47.

With respect to FIG. 11, the tube assembly 10 connects at the distal end 34 with a water supply valve 14 having a one-half inch compression fitting for the threaded opening 15. The nut is conventional, and the C-clip 40 slidingly engages a second one 20c of the grooves 20 from the end 34 of the tube 16. The gasket 44 is received on the portion of the tube 16 between the end 34 and the C-clip 40, and seats against the C-clip 40. The nut 46 threadingly engages the opening 15, and the gasket 44 seals the pressurized connection between the water supply valve 14 and the tube 16. Similarly, the gasket 115 is used rather than the gasket 44 for making sealed connection to a ⅞ inch ballcock threaded fitting as is found on some other fixtures.

The present invention is also useful with installing a water supply tube of a pre-determined length to communicate water under pressure between the water supply valve 14 and the water fixture 12. For example, hardware centers servicing "do-it-yourselfers" as well as professionals can provide a kit that includes the tube 16 cut to a specific length, with the appropriate nuts and C-clips for the specific installation. The tube 16 slidingly receives the pair of nuts 38, 46 in opposing relation. The pair of C-clips 40, 47 engage respective ones of the recesses 20 in opposing distal end portions 30, 34 of the tube 16. The appropriate gasket 44, 50, or 115 is positioned on the respective distal end portions 30, 34 of the tube 16. The gaskets bottom against the C-clips. The nuts 38, 46 are threadingly engaged to the inlet tube 32 and the open end 15 of the supply valve 14. The gaskets seal the connections between the respective distal ends 30, 34 of the tube 16 and the fixture inlet tube 32 and the water supply opening 15 while the nuts bear against respective surfaces of the C-clips 40, 47.

The C-clips 40,47 are preferably formed of a wear resistant material having memory, so that the C-clips return to an original shape conforming to the exterior of the tube 16 as defined by the ridges 18 and grooves 20 after installation on the tube. In a preferred embodiment, the C-clips are made of polyacetel.

It is thus seen that an apparatus and method of connecting fixtures to water supply valves is provided, which apparatus is readily assembled at the job site while minimizing waste, particularly for connection of one-half inch IP or compression fittings, three-eights compression fittings, and seven-eighths ballcock fittings. While this invention has been described in detail with particular reference to the preferred embodiments thereof, the principles and modes of operation of the present invention have been described in the foregoing specification. The invention is not to be construed as limited to the particular forms disclosed because these are regarded as illustrative rather than restrictive. Moreover, modifications, variations and changes may be made by those skilled in the art without departure from the spirit and scope of the invention as described by the following claims.

What is claimed is:

1. A tube assembly for communicating water under pressure from a water supply valve and a water fixture inlet tube, comprising:
    an elongate tube defining a plurality of annular corrugations having alternating grooves and ridges and cut to length to extend between a water fixture inlet tube and a water supply valve;
    a pair of nuts received on the elongate tube in opposing relation, each having interior threads sized for threadingly engaging a respective one of a water fixture inlet tube and a water supply valve;
    a pair of C-clips, received on the tube, each defining an inwardly extending flange on an inner surface received in a respective one of the grooves between two of the ridges in opposing distal end portions of the elongate tube, which C-clips define bearing surfaces for the nuts;
    a pair of gaskets received on opposing distal ends of the elongate tube, each adapted for sealing between the respective distal end of the elongate tube and the water fixture inlet tube and the water supply valve,
    whereby the respective distal ends of the elongate tube sealing engages the water supply valve and the fixture inlet tube with the respective nuts bearing against the C-clips.

2. The tube assembly as recited in claim 1, wherein the water fixture inlet tube connects to the elongate tube with a ½ inch iron pipe connection, wherein a first one of the pair of C-clips attaches to the third groove from a first one of the opposing distal ends.

3. The tube assembly as recited in claim 2, wherein the water supply valve connects with a ⅜ inch compression fitting, wherein a first one of the gaskets comprises:
    a tubular member having a first flange intermediate opposing distal ends extending radially to define a tailpiece received in a threaded opening of the water supply valve
    a resilient body received on the member and seated against the flange
    whereby the tailpiece, being received in the opening of the water supply valve, disposes the resilient body on an upper surface for sealing the connection between the second distal end of the tube and the water supply valve; and
    wherein a second one of the C-clips engages a first one of the grooves from the respective distal end of the tube.

4. The tube assembly as recited in claim 3, wherein the member defines a second flange spaced-apart from the first flange and extending radially of the member, and the resilient body enveloping the second flange.

5. The tube assembly as recited in claim 2, wherein the water supply valve connects with a ½ inch compression fitting, wherein a second one of the C-clips engages a second one of the grooves from the respective distal end of the tube.

6. The tube assembly as recited in claim 5, wherein the gasket received in the water supply valve comprises a resilient body defining an interior corrugated surface conforming to the corrugations of the elongate tube for conformingly engaging the gasket to the tube.

7. The tube assembly as recited in claim 2, wherein the water supply valve connects with a ⅞ inch ballcock fitting, wherein a second one of the C-clip engages a second one of the grooves from the respective distal end of the tube.

8. The tube assembly as recited in claim 7, wherein the gasket received in the water supply valve comprises a resilient body defining an interior corrugated surface conforming to the corrugations of the elongate tube for conformingly engaging the gasket to the tubec and defining an arcuate exterior surface tapering from:a wide first base to a narrower second base.

9. A method of connecting a water supply valve and a water fixture inlet tube with a tube assembly for communicating water under pressure, comprising the steps of:
    (a) slidingly receiving a pair of nuts in opposing relation on an elongate tube that defines a plurality of annular corrugations having alternating grooves and ridges;
    (b) engaging one of a pair of C-clips onto a respective selected one of the grooves in opposing distal end portions of the elongate tube, each said C-clip being provided with an inwardly extending flange on an inner surface thereof conformingly received in said groove;
    (c) placing one of a pair of gaskets on the opposing distal end portions of the elongate tube and each bottoming against one of the C-clips;
    (d) connecting the respective distal ends of the elongate tube to the fixture inlet tube and the water supply tube, whereby the gaskets seal the connections between the respective distal ends of the elongate tube and the fixture inlet tube and the water supply tube while the nuts bear against respective second surfaces of the C-clips.

10. A tube assembly for communicating water under pressure from a water supply valve and a water fixture inlet tube, comprising:

an elongate tube defining a plurality of annular corrugations having alternating grooves and ridges and cut to length to extend between a water fixture inlet tube and a water supply valve;

a first nut having an interior thread sized for threadingly engaging the water fixture inlet tube received on the elongate tube and defining a bottom interior surface;

a first C-clip received in a selected one of the grooves in a portion of the tube near a first distal end;

a first gasket received on the first portion of the tube and bottoming against a first surface of the first C-clip, whereby the first distal end engages the water fixture inlet tube by inserting the first gasket into an open end of the inlet tube and securing thereto with the first nut in which the bottom interior surface bears against a second surface of the first C-clip;

a second nut having an interior thread sized for threadingly engaging the water supply valve received on the elongate tube and defining a bottom interior surface;

a second C-clip received in a selected one of the grooves in a portion of the tube near a second distal end;

a second gasket received on the second portion of the tube and bottoming against a first surface of the second C-clip, each said C-clip defining an inwardly extending flange on an inner surface conformingly received in said respective one of the grooves;

whereby the second distal end engages the water supply valve by inserting the second gasket into an open end of the valve and securing thereto with the second nut in which the bottom interior surface thereof bears against a second surface of the second C-clip.

11. The tube assembly as recited in claim 10, wherein the water fixture inlet tube connects to the tube with a ½ inch iron pipe connection, wherein the first C-clip attaches to the. third one of the grooves from the first distal end.

12. The tube assembly as recited in claim 11, wherein the water supply valve connects with a ⅜ inch compression fitting, wherein the second gasket comprises:

a metallic member having an elongate tailpiece received in a threaded opening of the water supply valve with a pair of opposed flanges extending radially of the member;

a resilient body received between the pair of opposed flanges, whereby the tailpipe, being received in the opening of the water supply valve, disposes the resilient body on an upper surface for sealing the connection between the second distal end of the tube and the water supply valve.

13. A tube assembly for communicating water under pressure from a water supply valve having a conventional one-half inch compression fitting and a water fixture inlet tube having a conventional one-half inch iron pipe fitting, comprising:

an elongate tube defining a plurality of annular corrugations having alternating grooves and ridges and cut to length to extend between a water fixture inlet tube having a conventional one-half inch iron pipe fitting and a water supply valve having a conventional one-half inch compression fitting;

a first nut having an interior thread sized for threadingly engaging the water fixture inlet tube received on the elongate tube and defining a bottom interior surface;

a first C-clip having a radiused inwardly extending flange on an inner surface received in a third one of the grooves from a first distal end of the tube;

a first gasket received on the first distal end portion of the tube and bottoming against a first surface of the first C-clip, whereby the first distal end engages the water fixture inlet tube by inserting the first gasket into an open end of the inlet tube and securing thereto with the first nut in which the bottom interior surface bears against a second surface of the first C-clip;

a second nut having an interior thread sized for threadingly engaging the water supply valve received on the elongate tube and defining a bottom interior surface;

a second C-clip having an arcuate radiused inwardly extending flange on an inner surface received in a second one of the grooves from a second distal end of the tube;

a second gasket received on a second portion of the tube and bottoming against a first surface of the second C-clip, whereby the second distal end engages the water supply valve by inserting the second gasket into an open end of the valve and securing thereto with the second nut in which the bottom interior surface thereof bears against a second surface of the second C-clip.

14. A tube assembly for communicating water under pressure from a water supply valve and a water fixture inlet tube, comprising:

an elongate tube defining a plurality of annular corrugations having alternating grooves and ridges and cut to length to extend between a water fixture inlet tube and a water supply valve;

a first nut having an interior ½ inch iron pipe threaded for threadingly engaging the water fixture inlet tube received on the elongate tube and defining a bottom interior surface;

a first C-clip received in a third one of the grooves from a first distal end;

a first gasket received on the first portion of the tube and bottoming against a first surface of the first C-clip, whereby the first distal end engages the water fixture inlet tube by inserting the first gasket into an open end of the inlet tube and securing thereto with the first nut in which the bottom interior surface bears against a second surface of the first C-clip;

a second nut having an interior ⅜ inch compression threaded for threadingly engaging the water supply valve received on the elongate tube and defining a bottom interior surface;

a second C-clip received in a selected one of the grooves in a portion of the tube near a second distal end;

a second gasket received on the second portion of the tube and bottoming against a first surface of the second C-clip, said second gasket comprising:

a metallic member having an elongate tailpiece received in a threaded opening of the water supply valve with a pair of opposed flanges extending radially of the member;

a resilient body received between the pair of opposed flanges, whereby the tailpipe, being received in the opening of the water supply valve, disposes the resilient body on an upper surface for sealing the connection between the second distal end of the tube and the water supply valve;

whereby the second distal end engages the water supply valve by inserting the second gasket into an open end of the valve and securing thereto with the second nut in which the bottom interior surface thereof bears against a second surface of the second C-clip.

15. A tube assembly for communicating water under pressure from a water supply valve and a water fixture inlet tube, comprising:

an elongate tube defining a plurality of annular corrugations having alternating grooves and ridges and cut to length to extend between a water fixture inlet tube and a water supply valve;

a first nut having an interior ½ inch iron pipe threaded for threadingly engaging the water fixture inlet tube received on the elongate tube;

a second nut having an interior ⅜ inch compression thread for threadingly engaging the water supply valve received on the elongate tube in opposing relation;

a first C-clip received in a groove third from a first one of the opposing distal ends of the elongate tube to define a bearing surface for the first nut;

a second C-clip received in a first groove at the second one of the opposing distal ends of the elongate tube to define a bearing surface for the second nut;

a first gasket comprising a tubular member with a first flange intermediate opposing distal ends extending radially to define a tailpiece received in a threaded opening of the water supply valve and a resilient body received on the tubular member and seated against the flange whereby the tailpiece, being received in the opening of the water supply valve, disposes the resilient body on an upper surface for sealing the connection between the second distal end of the tube and the water supply valve;

a second gasket adapted for sealing between the opposing distal ends of the tube and the water fixture inlet tube, whereby the respective distal ends of the tubes sealingly engage the water supply valve and the fixture inlet tube with the respective nuts bearing against the C-clips.

* * * * *